Figure 3:
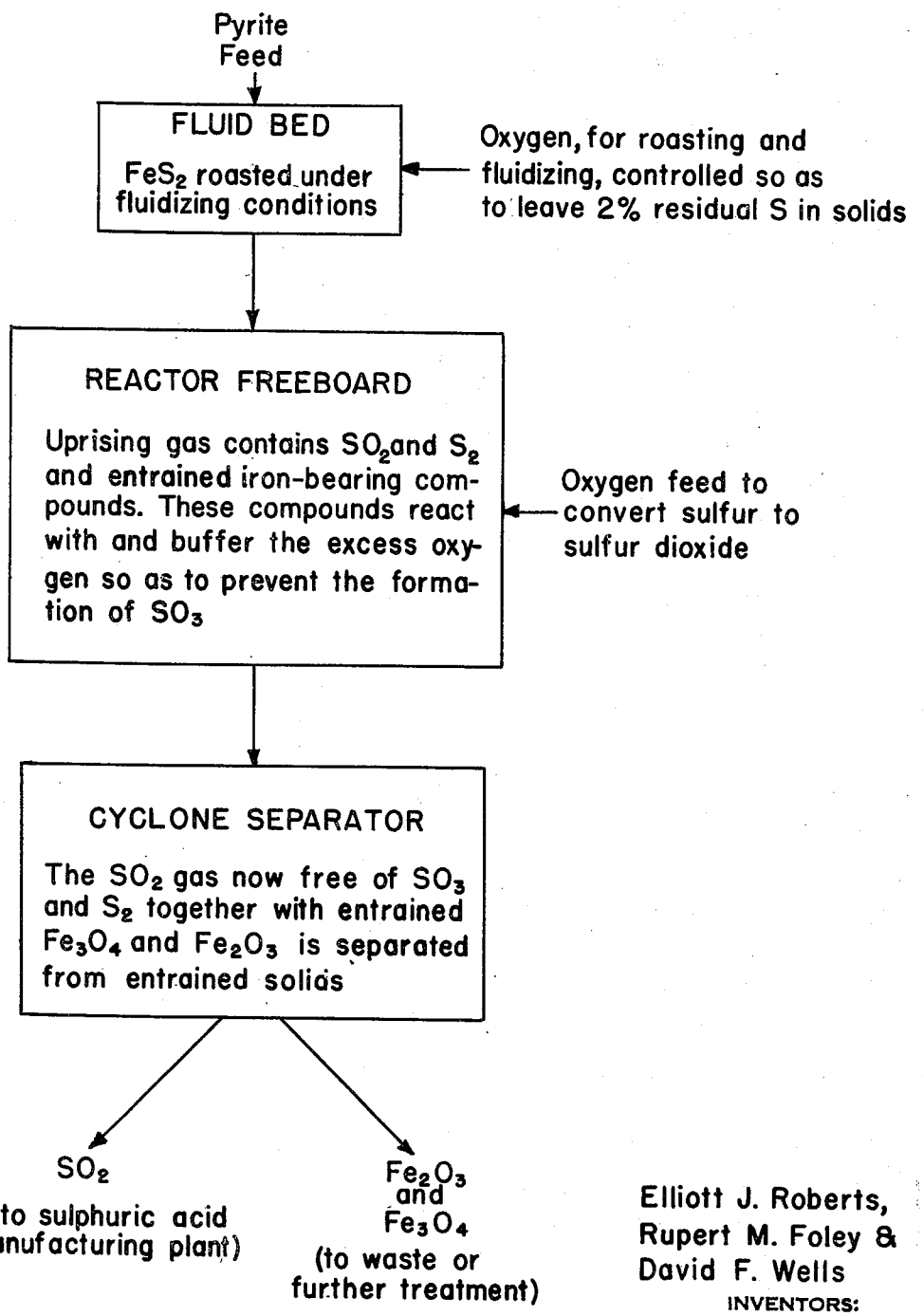

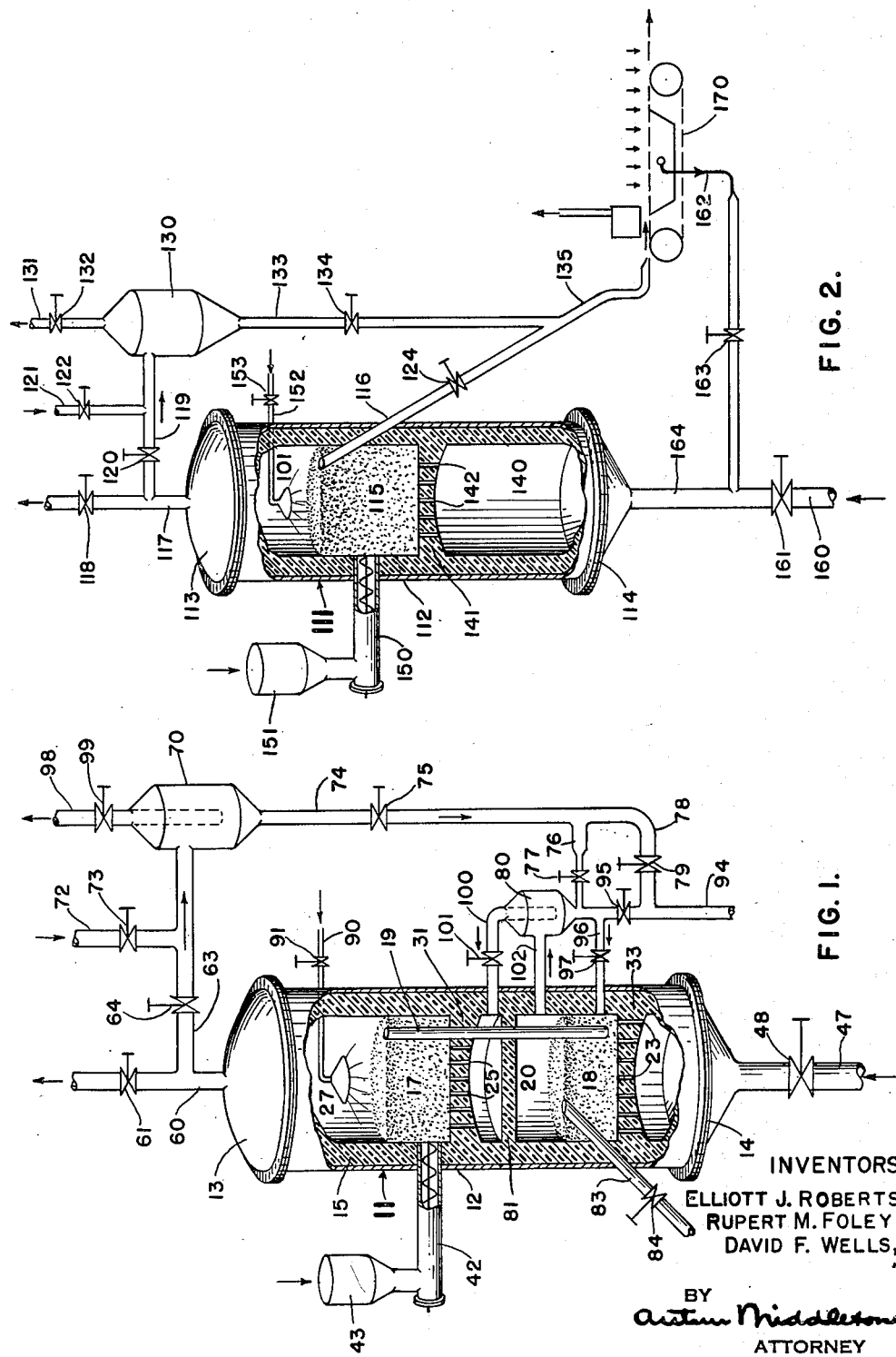

Patented Jan. 13, 1953

2,625,464

UNITED STATES PATENT OFFICE 2,625,464

ROASTING OF SULFIDES

Elliott J. Roberts, Rupert M. Foley, and David F. Wells, Westport, Conn., assignors to The Dorr Company, Stamford, Conn., a corporation of Delaware Application May 24, 1949, Serial No. 95,136

4 Claims. (Cl. 23—177)

This invention relates to the roasting of ores or concentrates which contain metal sulfides, in order to yield thereby gaseous sulfur dioxide free from objectionable sulfur trioxide and suitable for the manufacture of sulfuric acid. It is particularly adapted for the roasting of sulfidic metallurgical solids which also contain iron sulfide.

It has heretofore been proposed to roast metallurgical sulfides in connection with the manufacture of sulfuric acid. Such proposals have included roasting in shaft furnaces, multiple hearth kilns, flash roasters and combinations or variations thereof. These proposals have usually been employed in conjunction with systems having as a primary or concomitant aim the recovery or beneficiation of metal-values in the solids.

However, several disadvantages and difficulties have accompanied the known methods of roasting. Prominent among these are high operating and repair expense, trouble in maintaining uniform roasting temperatures and fusing and sintering of the solids during operation. Significantly, these methods have not been very efficient in overall utilization of the sulfide content of the metallurgical solids, while minimizing the formation of unwanted sulfur trioxide ($SO_3$) or contaminating sulfur vapor ($S_2$).

In manufacturing sulfuric acid from sulfur dioxide ($SO_2$), especially by the catalytic contact processes, initial or premature formation of sulfur trioxide is a nuisance and often leads to an unavoidable diminution in conversion efficiency. Sulfur trioxide readily absorbs water vapor from its surroundings and forms difficultly-absorbable mist or fog or droplets. It is true that such mist can largely be removed from the entraining sulfur dioxide gas by means of a high voltage electrical precipitation system, but such precipitation means is rather costly to install and operate; furthermore, the condensed sulfuric acid recovered is not usually suitable for sale or use and often needs to be neutralized (as by lime) prior to disposal as waste. Over a period of time, then, recovery of the sulfur trioxide mist and its requisite neutralization may entail a significant cost.

So, it is an object of this invention to overcome the above-mentioned difficulties and to provide an efficient, yet flexible method of roasting metallurgical sulfides to yield sulfur dioxide gas deficient in unwanted sulfur trioxide. Other objects of this invention will appear as this specification proceeds.

The limits of this invention are to be found in the appended claims and reference is made thereto in the event of any seeming limitations appearing in the following specification by virtue of the use of specific wording appropriate to a description of embodiments of the invention.

The underlying concept of this invention is that a roaster gas rich in sulfur dioxide yet lean in unwanted sulfur trioxide may be produced by roasting sulfidic metallurgical solid particles while the particles are maintained in turbulent, fluidized dense-suspension by an up-flowing stream of treatment gas and by further maintaining a certain minimum sulfide content within the dense-suspension. Corollary to this is the more particular concept that, when iron sulfide is present in the metallurgical solids, any sulfur vapor evolved with the gas may be oxidized selectively to sulfur dioxide by the addition of supplementary air or oxygen to the effluent roaster gas because any entrained particles of iron sulfide or oxide will have a buffering or stabilizing effect against the formation of sulfur trioxide. A still further variation of the concept lies in that if the metallurgical solids are later sintered, thereby yielding a gas rich in sulfur trioxide and sulfur vapor, these gases may be mixed with the fluidizing treatment gas and the overall sulfur-efficiency of the plant increased.

Fluidization of fine solid particles is a material feature of this invention. By fluidization, or fluidized, we herein mean the formation of a dense, turbulent, liquid-like thermally-homogeneous suspension of fine solid particles in an upflowing treatment gas stream. The suspended mass is commonly referred to as a fluidized bed and such terminology will be employed below.

A fluidized bed is to be distinguished chiefly by its liquid-like flow qualities. For example, the typical dilute solid-gas suspensions such as dusty air behave chiefly like the entraining or suspending gas while stagnant or immobile beds of solids through which gas percolates exhibit no joint flow qualities. The condition of fluidization is largely a function of the space velocity of the suspending gas, i. e., the volume of gas supplied to the solids per unit time divided by the gross cross-sectional area occupied by the mass of solids. Though some variation in fluidization space velocities depends on the size, density and shape of the solid particles, in general with particles finer than 4 mesh (Tyler standard screen) space velocities from 0.5 to 20 feet per second embrace the fluidization range. Velocities above and below these values yield respectively dilute suspensions or dispersions and stagnant or fixed beds. With a particular ore or concentrate, the determination of the proper fluidization space velocity is a matter of simple experiment.

In a simplified apparatus, fluidization of fine solids may be obtained in a substantially vertical, cylindrical vessel or reactor which is divided internally into an upper or fluidization zone and a lower or wind-box zone by an apertured partition or constriction plate. Air or other suitable treatment gas is supplied under pressure to the wind-box portion of the reactor and flows upward at fluidizing velocity through the vessel. Fine solid particles are supplied to the reactor above the constriction plate by either a standpipe or a screw conveyor; they gradually build up in volume until a distinct liquid-like surface level appears and the particles are substantially all fluidized. Thereupon, conditions such as temperature, gas composition, pressure, etc., are adjusted and regulated in accordance with the treatment sought and treated particles removed from the bed as by gravity flow. The gas rising from the bed passes through a disengaging space (hereafter referred to as the freeboard) where a quantity of any entrained solids falls back to the bed; from the freeboard the gas is conducted outside the reactor for discharge or further processing as required.

The invention may be more readily understood by reference to the drawings wherein:

Fig. 1 is a sectional partial perspective view of a reactor and associated apparatus suitable for practicing the two-bed embodiment of this invention. Fig. 2 is a vertical sectional view of a simple one-bed reactor useful in performing a partial roast on sulfidic solids which is then followed by a conventional sintering operation wherein sinter gases are recycled to the reactor. Figure 3 is an idealized flowsheet showing the reactions and operations which occur in various portions of the reactor.

More particularly in Fig. 1 there is shown a vertical cylindrical reactor collectively designated 11 which has a detachable top-member 13, a detachable bottom-member 14 and side-wall members 12. Internally, the vessel 11 is lined with refractory brick 15 and has two horizontal apertured partitions 31 and 33 therein which are each adapted to support fluidized beds 17 and 18 respectively. Downcomer 19 leads from the surface level of bed 17 to a point below the surface level of bed 18 and serves to conduct treated solids in bed 17 to bed 18. Above bed 17 is freeboard zone 27 and above bed 18 is freeboard zone 20. Fine solid particles of metallurgical sulfides (e. g. a zinc or iron or copper sulfidic ore or concentrate) are supplied to top bed 17 by means of screw-conveyor 42, which in turn is supplied by hopper 43. Gas for fluidizing and treatment of the solids in beds 17 and 18 is supplied to the lower portion of vessel 11 by means of conduit 47 and the rate thereof controlled by valve 48. The treatment gas rises through the apertures 23 of horizontal partition 33 and enters bed 18; it then rises through freeboard zone 20, passes through cyclone 80, and then is returned above gas-impermeable partition 81 whence it rises through the apertures 25 of horizontal partition 31 to bed 17. From bed 17, the gas flows up through freeboard zone 27 and leaves reactor 11 by means of conduit 60; the effluent gas may either be conducted directly to other processing (not shown) by adjustment of valve 61 or else through branch conduit 63 (having valve 64) to dust-separating cyclone 70. Prior to entrance into cyclone 70, a small stream of oxygen or air may be bled into the effluent gas by means of conduit 72 (having valve 73). This serves to oxidize any entrained vaporous sulfur selectively to sulfur dioxide by virtue of the following reactions which exert a stabilizing or buffering effect on the oxidation of sulfur vapor.

1. $FeS + 1\tfrac{1}{2}O_2 \rightarrow FeO + SO_2$
2. $3FeO + \tfrac{1}{2}O_2 \rightarrow Fe_3O_4$
3. $2Fe_3O_4 + \tfrac{1}{2}O_2 \rightarrow 3Fe_2O_3$
4. $2Fe_3O_4 + SO_3 \rightarrow 3Fe_2O_3 + SO_2$ Thus, it is not necessary to carefully proportion the oxygen supply to the effluent gas, since any sulfur trioxide formed may be converted back to sulfur dioxide, as shown by Reaction 4. In the operation of any fluidized bed a certain amount of fine solids are unavoidably entrained with the gas. This invention proposes to utilize this normal disadvantage as an important processing advantage when treating metallurgical sulfides. As far as the character of the solids entrained from bed 17 is concerned, it may be remarked that a relatively small amount of them are sulfidic since the greater proportion of the solid particles in bed 17 are already oxidized. Thus, the solids are largely already oxidized to one of the lower oxides of iron and Reactions 2, 3 and 4 can readily occur. The sulfur-trioxide free gas emanating from cyclone 70 is thereafter conducted to conventional pre-treating means prior to use in sulfuric acid manufacture by means of conduit 98 (having valve 99).

With regard to the solid particles separated from gas in cyclones 70 and 80, these may be combined with the fully treated solids which are removed from lower bed 18 by means of conduit 83 (having valve 84); or these solids may be sent directly to bed 18 below the surface level therein. These variations may be achieved by the opening or closing of valve 75 in conduit 74, valve 77 in conduit 76, valve 79 in conduit 78, valve 98 in conduit 96 and/or valve 95 in conduit 94.

In starting up the process as depicted in Fig. 1, air under pressure is first supplied to vessel 11 through conduit 47; to this is added fluid fuel such as natural gas which is ignited within vessel 11 and serves to pre-heat it. When the vessel 11 is up to a sulfide oxidation temperature as about 800° C., fine metallurgical sulfide solid particles are supplied to bed 17 from hopper 43 by means of screw-conveyor 42. These particles oxidize rapidly and thereupon the process is thermally autogenous and the supply of external fuel to conduit 47 may be discontinued. Gradually, the level of fluidized solids in bed 17 builds up until the inlet level of downcomer 19 is reached, whereupon partially-treated solids flow down the downcomer to a point above partition 33. These partially-treated solids accumulate in fluidized state until the upper end of conduit 83 is reached, whereupon they flow to a point outside reactor vessel 11 for further use which is beyond the scope of this invention. The bed 17 develops a good deal of heat, particularly if the sulfide content of the feed particles is high; this may necessitate cooling means for bed 17. In Fig. 1 we have shown one means as a simple water spray which enters the reactor 11 through conduit 90 and the rate of water injection is controlled by valve 91. Other conventional cooling methods may be employed, however, such as the immersion of an indirect heat-exchanger coil in bed 17. The effluent gas rising through freeboard zone 27 leaves reactor 11 and may be conducted through dust-separating means as cyclone 70 which is done prior to conditioning (such as drying and cooling) for introduction to a catalytic converter.

With regard to the minimum sulfide sulfur content which is present in bed 17, we find that substantially 2% by weight of sulfur is a limit consistent with the avoidance of sulfur trioxide. However, we prefer to so adjust feed rates of solids particles to bed 17 and the supply of roasting, fluidizing air to reactor vessel 11 that about 4% to 6% sulfide sulfur is maintained in bed 17 and thereafter selectively oxidize any evolved sulfur in the roaster gas by using supplementary air and the buffering oxidation which we have previously indicated. By this method, sufficient sulfide sulfur is present in the partially treated solid particles which enter bed 18 to insure satisfactory oxidation therein and thus practically completely de-sulfurize the particles. Thus the two-bed embodiment of the invention illustrated by Fig. 1 is well adapted to completely de-sulfurize ore solids while insuring that the evolved gases are free of objectionable sulfur trioxide.

In Fig. 2 is shown a simpler form of roasting apparatus adapted principally for a partial roasting of metallurgical sulfides which treatment is later followed by a sintering treatment. In conventional sintering it is usually desirable to have the feed solids contain a sufficient amount of residual sulfide sulfur so that the oxidation therein is autogenous. However, sintering is not a uniform process so that gases evolved from a typical moving grate type sintering machine represent both oxidation carried on with insufficient air and that occurring with excess air; consequently the combustion gases recovered often contain relatively large amounts of sulfur vapor and sulfur trioxide. This invention affords a means for recovering and utilizing even these objectionable components in sinter gas. This is done by recycling some or all of the sinter gases to the fluidized-type reactor shown in Fig. 2.

Therein, the reactor vessel collectively designated 111 comprises side-wall member 112; detachable top-member 113 and detachable bottom-member 114. Internally, apertured constriction plate 141 divides reactor 111 into an upper reaction zone composed of fluidized-solids bed 115 and surmounting freeboard zone 101 and the underlying wind-box 140. Hopper 151 contains the raw feed solid particles which are moved by screw-conveyor 150 to form fluidized-bed 115 within reactor 111; treatment and fluidizing gas is supplied to windbox 140 through conduit 164. The gas or gases flow up the apertures 142 of constriction plate 141 at a fluidizing velocity whereupon they react with the metallurgical sulfide solid particles therein. As indicated in the description of Fig. 1, the solids input and gas input rates are correlated so that at least 2% sulfidic sulfur is maintained in bed 115. Roaster gas, rich in sulfur dioxide, rises through freeboard zone 101 and leaves reactor 111 by conduit 117. It may be conducted to other processing means (not shown) by opening valve 118 or else may be conducted through branch conduit 119 (having valve 120) to cyclone 130. Supplementary air or oxygen may be added by conduit 121 at a rate controlled by valve 122 to branch conduit 119 and thereby achieve the selective sulfur vapor oxidation previously described. Dust-free gas is emitted from cyclone 130 by conduit 131 (having valve 132).

Treated solids, having a significant residual sulfidic contact leave reactor 111 by flowing down discharge conduit 116 which has valve 117. These particles may be combined with fine dust separated in cyclone 130 and discharged therefrom through tail-pipe 133 (which has valve 134). The combined solids enter conduit 135 wherefrom they are conducted to a conventional sintering machine 170. Gases exhausted or derived from the sintering machine plant 170 are fully or partially recycled by means of conduit 162 at a rate controlled by valve 163 to conduit 164; there they meet roasting air supplied through conduit 160 at a rate regulated by valve 160. Starting-up operations are substantially as described in the Fig. 1; likewise, the bed temperature in reactor 111 may be controlled by injection of a non-combustible vaporizable liquid through conduit 152 (which has regulating valve 153). By this sequence of steps not only is a partial roast of the feed solids obtained which yields a product suitable for sintering, but the otherwise objectionable sinter gases are utilized with the roaster gas to form a gas suitable for catalytic, or even chamber, conversion to sulfuric acid or other purposes.

Having now described embodiments of our invention, what we claim is:

1. The process of producing sulfur-trioxide and sulfur free sulfur dioxide gas from pyrite comprising establishing and maintaining a fluidized bed of finely divided pyrite particles in a roasting zone, passing a free oxygen bearing gas therethrough at fluidizing velocity, reacting the particles with oxygen at roasting temperature to yield a gas comprising sulfur and sulfur dioxide, discharging roasted particles containing a minimum of 2% by weight of sulfidic sulfur from the bed, supplying oxygen to the gas to convert free sulfur to sulfur dioxide and preventing over-oxidation of the gases to sulfur trioxide by maintaining a trace of entrained iron bearing compound as a buffer in the gases.

2. The process according to claim 1, wherein the bed temperature is maintained by autogenous oxidation of combustible components of the feed solids.

3. The process according to claim 1, wherein the partially desulfurized ore is conducted to a subjacent bed, roasted with oxygen to yield gaseous oxides of sulfur, said oxides of sulfur being separated from the subjacent bed, and conducted to the initial bed.

4. The continuous process for treating finely-divided iron sulfide bearing solids to yield therefrom sulfur dioxide gas that is substantially free from both uncombined sulfur and sulfur trioxide, comprising establishing and maintaining a bed of such solids in a treatment zone maintained at solids roasting temperatures, maintaining the bed as a turbulent fluidized bed by passing therethrough at solids fluidizing velocities an uprising stream of fluidizing gas, roasting solids in the bed to yield a gas containing both uncombined sulfur and sulfur-dioxide as well as to yield roasted solids containing a minimum of 2% by weight of sulfidic-sulfur by maintaining in the uprising stream of gas supplied to the bed free-oxygen in an amount sufficient to yield both sulfur-dioxide and uncombined sulfur vapor but insufficient to convert more than 98% by weight of the sulfidic-sulfur of the bed to uncombined sulfur vapor and sulfur-dioxide, discharging roasted solids from the zone, discharging gases from the bed and from the zone, controlledly oxidizing the discharged gases by supplying thereto free-oxygen in an amount sufficient to substantially convert the uncombined sulfur vapor content thereof to sulfur-dioxide gas, and buffering the formation of sulfur-trioxide during oxidation of the sulfur content of the discharged gases by maintaining entrained in the gases during such oxidation sufficient iron bearing compounds in an oxidation state lower than $Fe_2O_3$ so that at least a trace of such compounds remain after oxidation of the sulfur is substantially completed.

ELLIOTT J. ROBERTS.
RUPERT M. FOLEY.
DAVID F. WELLS.

REFERENCES CITED

The following references are of record in the file of this patent:

UNITED STATES PATENTS

| Number | Name | Date |
|---|---|---|
| 1,941,592 | Bacon et al. | Jan. 2, 1934 |
| 1,984,380 | Odell | Dec. 18, 1934 |
| 2,367,351 | Hemminger | Jan. 16, 1945 |